United States Patent [19]
Takahashi et al.

[11] Patent Number: 5,901,129
[45] Date of Patent: May 4, 1999

[54] TRAY WITH POSITIONING PROTRUSION FOR LOADING A DISK CARTRIDGE

[75] Inventors: Yuji Takahashi; Ichiro Kawamura; Toshiaki Kashihara; Yoshio Hata, all of Osaka, Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/727,732

[22] Filed: Oct. 8, 1996

Related U.S. Application Data

[62] Division of application No. 08/530,430, Sep. 19, 1995.

[30] Foreign Application Priority Data

Sep. 20, 1994 [JP] Japan .................................. 6-224369

[51] Int. Cl.⁶ .............................. G11B 17/04; G11B 33/02
[52] U.S. Cl. ...................... 369/75.2; 369/77.2; 360/99.06
[58] Field of Search .................................... 369/290, 291, 369/77.1, 77.2, 75.1, 75.2; 360/133, 99.02, 99.06

[56] References Cited

U.S. PATENT DOCUMENTS

| | | | |
|---|---|---|---|
| 3,529,301 | 9/1970 | Hiruta | 340/174.1 |
| 4,532,564 | 7/1985 | Larson et al. | 360/133 |
| 5,040,167 | 8/1991 | Tanaka et al. | 360/133 |
| 5,126,899 | 6/1992 | Kanazawa | 360/99.02 |
| 5,216,558 | 6/1993 | Griffith et al. | 360/99.02 |
| 5,325,243 | 6/1994 | Rath et al. | 369/77.2 |
| 5,329,504 | 7/1994 | Mukawa | 369/77.2 |
| 5,367,422 | 11/1994 | Fujisawa et al. | 360/133 |
| 5,530,691 | 6/1996 | Fujisawa | 360/133 |
| 5,617,396 | 4/1997 | Choi | 369/292 |

*Primary Examiner*—David L. Ometz
*Attorney, Agent, or Firm*—McDermott, Will & Emery

[57] ABSTRACT

A flat tray (1) for receiving a disk cartridge (21) for a disk loading apparatus, wherein positioning holes (28) are provided at the rear end (27a), on a peripheral side, of the disk cartridge, and protrusions (18) are formed on the tray providing for a rigid positioning of the cartridge in order to fix the cartridge at the specified position on the tray. The protrusions (18) may be made of leaf springs that are formed with one end curved. When the disk cartridge (21) is pushed into the tray (1), the curved portions of the protrusions match the positioning holes (28) on the disk cartridge.

7 Claims, 8 Drawing Sheets

FIG. 10
FIG. 11
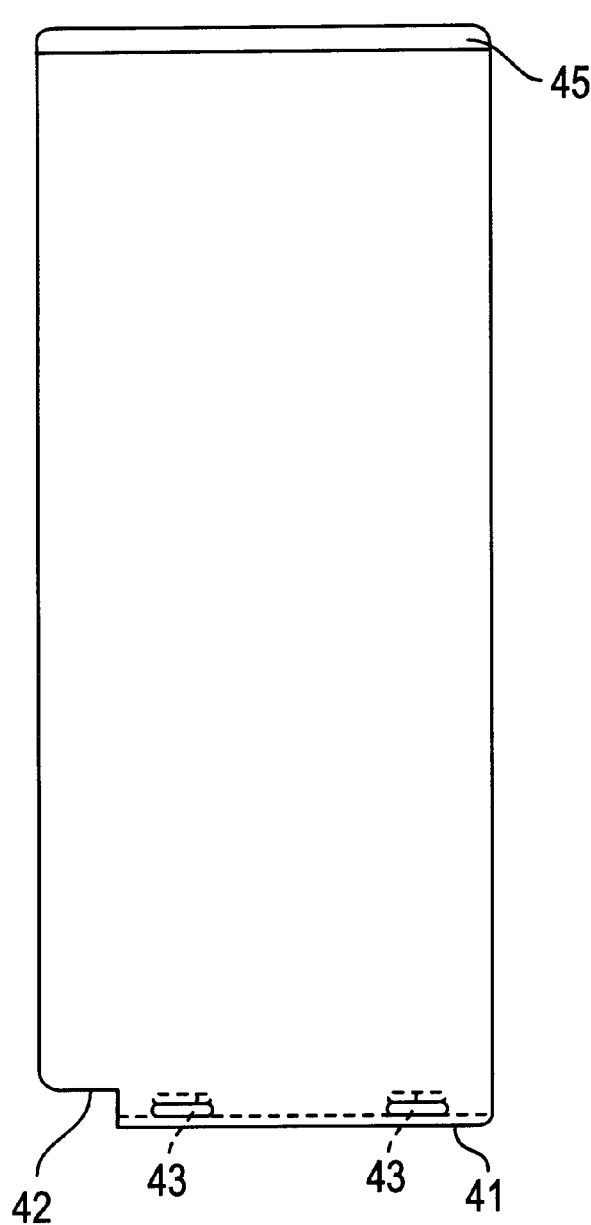
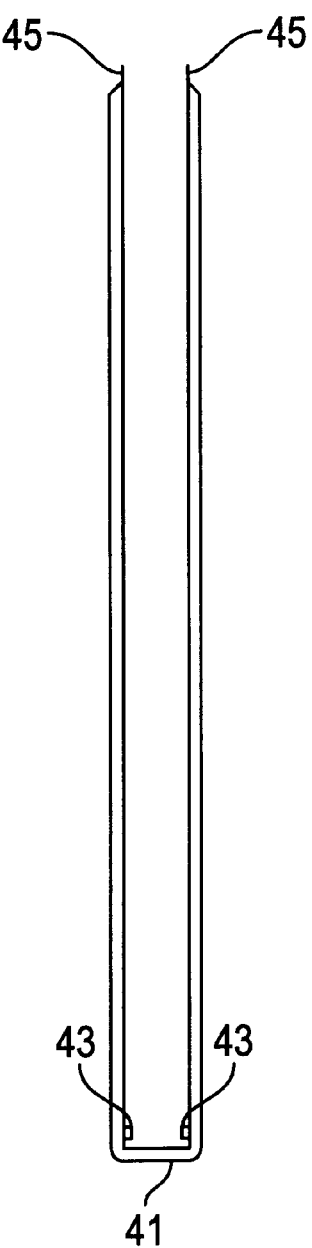
FIG. 12
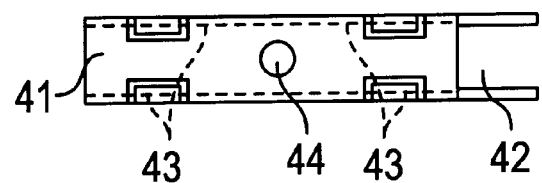

TRAY WITH POSITIONING PROTRUSION FOR LOADING A DISK CARTRIDGE

This is a divisional of application Ser. No. 08/530,430, filed Sep. 19, 1995, pending.

BACKGROUND OF THE INVENTION

The present invention relates to a disk cartridge accommodating a disk for storing information such as an optical disk, and a tray for loading such a disk cartridge and conveying into a disk loading apparatus.

Recently, an information recording and reproducing apparatus using an optical disk has come to be used in a personal computer or the like. In the information recording and reproducing apparatus, a disk cartridge accommodating the optical disk is used, and also a disk loading apparatus for setting the cartridge at the recording and reproducing position is used.

The disk cartridge is composed of a molded resin case having a window extending from the middle to the end formed on the face side and the back side, a shutter covering the windows and movable in the lateral direction, and an optical disk put in the case.

The disk loading apparatus comprises a tray for conveying the mounted disk cartridge up to the recording and reproducing position, fixing means for fixing the disk at the recording and reproducing position, and rotating means for rotating the disk. The tray is assembled in the disk loading apparatus so as to move in the longitudinal direction. This tray move is effected usually by a loading motor. On the outer circumference of the tray, a surrounding wall is nearly in the same height as the thickness of the disk cartridge so that the disk cartridge may not slip off the tray during conveyance.

In this disk loading apparatus, first the tray is drawn out, and the disk cartridge is mounted on the tray so that the shutter may be located in the inserting direction. Next, the tray moves into the disk loading apparatus, and the disk is fixed at the recording and reproducing position, Consequently, the shutter is opened, and the disk rotates to record or reproduce.

In such conventional disk loading apparatus, when the cartridge is merely put on the tray and is not fixed on the tray, the cartridge may possibly happen to move during conveyance. In particular, when the disk loading apparatus is installed so that the disk surface may be vertical, during conveyance, the cartridge may sway in its thickness direction and the cartridge may not be fixed correctly at the specified position.

Besides, when setting the cartridge on the tray, if the cartridge is set upside down by mistake, it is directly conveyed, and correctness of the cartridge loading operation cannot be easily distinguished.

SUMMARY OF THE INVENTION

The disk cartridge of the invention comprises a disk and a flat case for accommodating the disk, and a positioning hole is provided on the peripheral side of the case. The tray of the invention has a positioning protrusion to be fitted into the hole provided at the inside of the outer peripheral wall of the tray. By mounting the cartridge on the tray so that the protrusion and the hole may be fitted, loosening or sway of the cartridge can be prevented during conveyance.

In particular, when the hole is formed in the rear end of the peripheral side, and the protrusion in the front wall of the outer peripheral wall, respectively, the cartridge is mounted on the tray from the front end side, as compared with the case of forming the hole and protrusion on the other side and other outer peripheral wall, respectively, so that the cartridge loading operation is easier.

Moreover, by forming the holes and protrusions at asymmetrical positions in the tray moving direction, wrong mounting upside down on the tray is prevented. That is, if mounted on the wrong side, the hole and protrusion are not fitted, and hence the cartridge is not set in the correct position. Therefore, wrong mounting is detected easily when loading.

Or, instead of forming the holes and protrusions at asymmetrical positions, face or back detecting recesses may be provided near the rear end on the back side of the case, and projections to be matched with the recesses of the case may be provided in the bottom of the tray. In this case, too, if set upside down, the recesses and projections are not matched, and the rear end of the cartridge is lifted from the tray, so that wrong mounting can be easily detected.

Besides, grooves reaching from the left side to the right side of the case may be formed near the rear end on both face and back sides of the case. The bottoms of the grooves may be inclined to the both sides. In this case, a light emitter for emitting a light beam toward the bottom of the groove, and a photo sensor for receiving its reflected light beam are arranged at proper positions of the tray, and the reflection direction of the reflected light beam differs between when the cartridge is mounted on the face side and when the cartridge is mounted on the back side, so that the sides of the cartridge can be judged from the signal of the photo sensor.

BRIEF DESCRIPTION OF THE DRAWINGS

FIG. 10 is a plan view of the shutter seen from the back side.

FIG. 11 is a side view of the shutter seen from the left side.

FIG. 12 is a side view of the shutter seen from the front end side.

DESCRIPTION OF THE PREFERRED EMBODIMENTS

Figure 1:
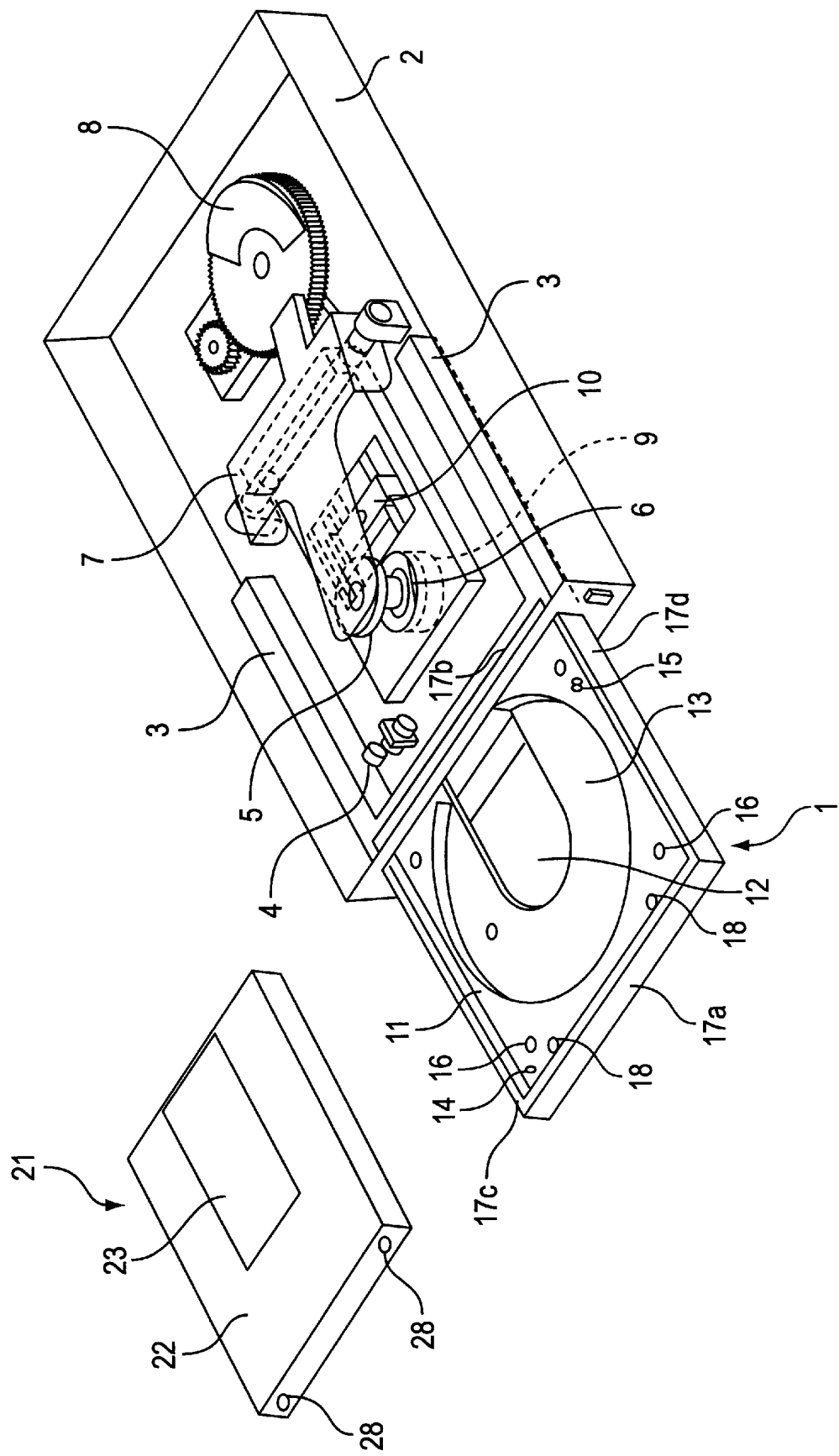
FIG. 1 is a perspective view of a disk loading apparatus including a tray of the invention, and a disk cartridge of the invention.

First, a disk loading apparatus is described below by referring to FIG. 1.

The disk loading apparatus comprises a tray for loading a disk cartridge and conveying it to a recording and reproducing position, fixing means for fixing the conveyed disk at the recording and reproducing position, and rotating means for rotating the fixed disk.

A tray 1 on which a disk cartridge 21 is mounted correctly is moved into a housing 2. This move is effected by moving means combining a rack 3 extended from the tray to the inner side of the housing 2 and a loading motor 4 provided with a gear. In the conveying process, a shutter 23 opens, and the central part of the disk accommodated in a case 22 is pinched by a clamp 5 and a turntable 6, and the disk is fixed. This fixing is effected by fixing means making use of seesaw motion of an arm 7, that is, by the fixing means of which cam 8 rotates to raise the rear end of the arm 7 and lower the clamp 5 attached to the front end of the arm 7. Incidentally, a disk rotating motor 9 and the turntable 6 attached thereto can move vertically, and when the central part of the disk reaches the position of the turntable 6, the turntable 6 is at an elevated position. Consequently, the disk is rotated by the motor 9, and recording and reproducing is done by an optical head 10.

The tray of the invention is described below.

In the bottom 11 of the tray 1, a window 12 for recording and reproducing is opened, and a circular dent 13 is formed so that a bare disk can be also mounted. Near the outer circumference of the bottom 11, detection switches 14, 15, and a pair of projections 16 for detecting the face and back of the cartridge are formed. The detection switch 14 is for judging if the cartridge 21 is mounted on the tray 1 or not. This is used for setting the recording and reproducing conditions, such as the laser light intensity of the optical head 10 and rotating condition of disk. The detection switch 15 is intended to detect the code holes expressing prohibition of recording or type of disk provided in the cartridge 21. This is utilized for realizing specified recording and reproducing operations.

Figure 13:
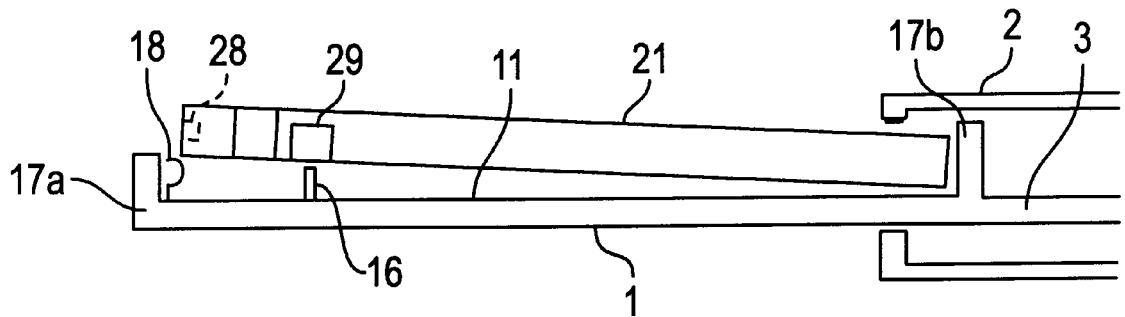
FIG. 13 and FIG. 14 are diagrams showing the state of correct mounting of the cartridge on the tray.

On the outer circumference of the tray 1, walls 17a, 17b, 17c, 17d are formed to prevent the disk cartridge 21 from slipping down during conveyance. Inside of the front wall 17a, a pair of push springs 18 are provided as positioning protrusions for positioning the cartridge. The push springs 18 are composed of leaf springs of which one end is curved as shown in FIG. 13. When the cartridge 21 is mounted, the curved portions match with a pair of holes 28 in the cartridge 21.

Referring now to FIG. 2 to FIG. 7, the disk cartridge of the invention detachably mounted on the tray is described in detail below.

The cartridge 21 comprises an optical disk (not shown), a resin case 22 for accommodating the optical disk, and a resin shutter 23. The case 22 is composed of two combined plates 22a, 22b made of resin by using molding method. A window 24 for exposing the disk at the time of recording and reproducing is opened in the case 22 on both face and back sides from the middle to the front end side. The shutter 23 movable in the lateral direction along a support piece 25 is provided to cover the window 24. The portion 26 of the case 22 corresponding to the moving region of the shutter 23 is thin in the thickness of the resin plates 22a, 22b by the portion of the thickness of the shutter 23 so that the case 22 and shutter 23 may be flush on a same plane.

At the rear end side 27a of the case 22, a pair of holes 28 for positioning are formed at symmetrical positions in the insertion direction of the cartridge 21. These holes 28 are formed at positions corresponding to the push springs 18 of the tray 1, and when the cartridge 21 is mounted on the tray 1, the holes 28 are fitted with the push springs 18. Recesses 29 for detecting face and back side opened at the side and back are formed near the rear end on the left side 27c and the right side 27d. These recesses 29 are formed at positions to be matched with the projections 16 of the tray 1 when the cartridge 21 is mounted on the tray 1.

Figure 14:
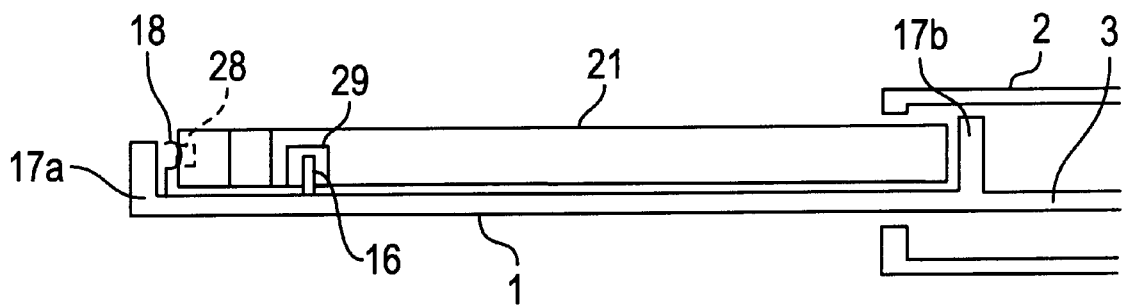

The manipulation for mounting the cartridge 21 on the tray 1 is described below while referring to FIG. 13, FIG. 14, and FIG. 15.

As shown in FIG. 13, with the face side of the cartridge 21 up, the front end side 27b of the cartridge 21 is fitted to the inner wall 17b of the tray 1. When the vicinity of the rear end of the face of the cartridge 21 is pushed in, as shown in FIG. 14, the push springs 18 are deformed elastically, and the holes 28 and push springs 18 are fitted. At the same time, the projections 16 get into the recesses 29. Consequently, the cartridge 21 is pushed to the inner wall 17b by the spring pressure of the push springs 18, and is supported firmly. Therefore, whether the tray is installed in horizontal position or in vertical position, the cartridge 21 does not sway or swing in the course of conveyance.

In this embodiment, moreover, since the holes 28 are formed in the rear end side 27a and the push springs 18 in the front wall 17a, the cartridge 21 is mounted on the tray 1 from the front end side 27b. Therefore, as compared with the case of forming the holes and push springs at other sides 27b, 27c, 27d and other peripheral walls 17b, 17c, 17d, respectively, loading operation of the cartridge 21 is easier in this case.

Figure 15:
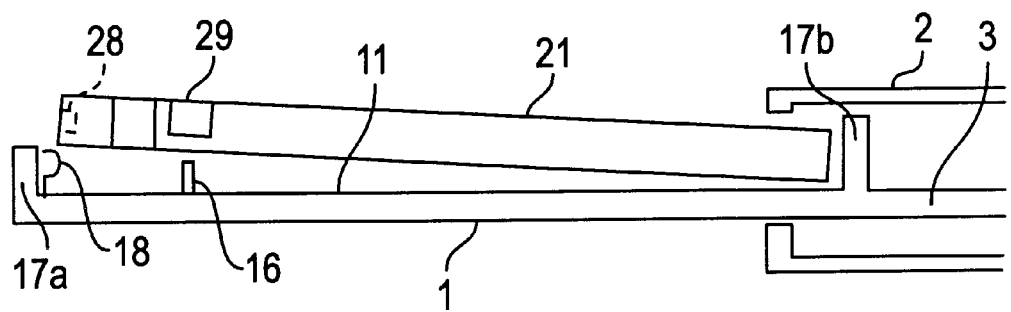
FIG. 15 is a diagram showing a wrong mounting state of the cartridge on the tray.

On the other hand, if the cartridge 21 is mounted on the tray 1 upside down, as shown in FIG. 15, the projections 16 hit against the surface of the case 22, and are not matched with the recesses 29. Therefore, the rear end side 27a of the cartridge 21 is lifted from the bottom 11 of the tray 1. In this embodiment, in particular, since the recesses 29 are provided near the rear end of the cartridge 21, and the projections 16 are formed near the front wall 17a of the tray 1, the lifting of the cartridge 21 is more obvious than in the case of forming recesses near the front end side 27b and projections near the inner wall 17b. Therefore, wrong side can be easily detected when starting loading, so that loading operation can be done again immediately. In the case of forming the recesses near the front end and the projections near the inner wall 17b, meanwhile, when mounting the cartridge 21, the case 22 is likely to interfere with the projections 16, and particular caution is needed in loading operation. In this embodiment, by contrast, since the project ions 16 are formed near the front wall 17a, the cartridge 21 can be easily loaded from the front end side.

A certain disk loading apparatus is furnished with an automatic cartridge-changer for selecting a desired one from a plurality of stored disk cartridges, and loading and unloading is automatically in the tray. To permit the use of the automatic cartridge-changer, the cartridge 21 of the embodiment has notches 30 for automatic cartridge-changer provided at the further rear end sides of the recesses 29 on the left side 27c and the right side 27d of the case 22. These notches 30 are cut to the depth in the lateral direction being equal to or greater than the width in the insertion direction.

Since the notches 30 are formed deep, the cartridge 21 can be caught securely by gripping tools of the automatic cartridge-changer. Moreover, since the notches 30 are formed at positions near the corners not contacting at all with the circular disks stored in the cartridge 21, it is not necessary to increase the size of the case 22 for forming deep notches 30. Therefore, to be applicable to the automatic cartridge-changer, it is not necessary to increase the size of the case 22, which contributes to the decrease of moving stroke of the gripping tools and reduction of size of the automatic cartridge-changer.

Two resin plates 22a, 22b for composing the case 22 are fabricated independently by the resin forming method.

Figure 2:
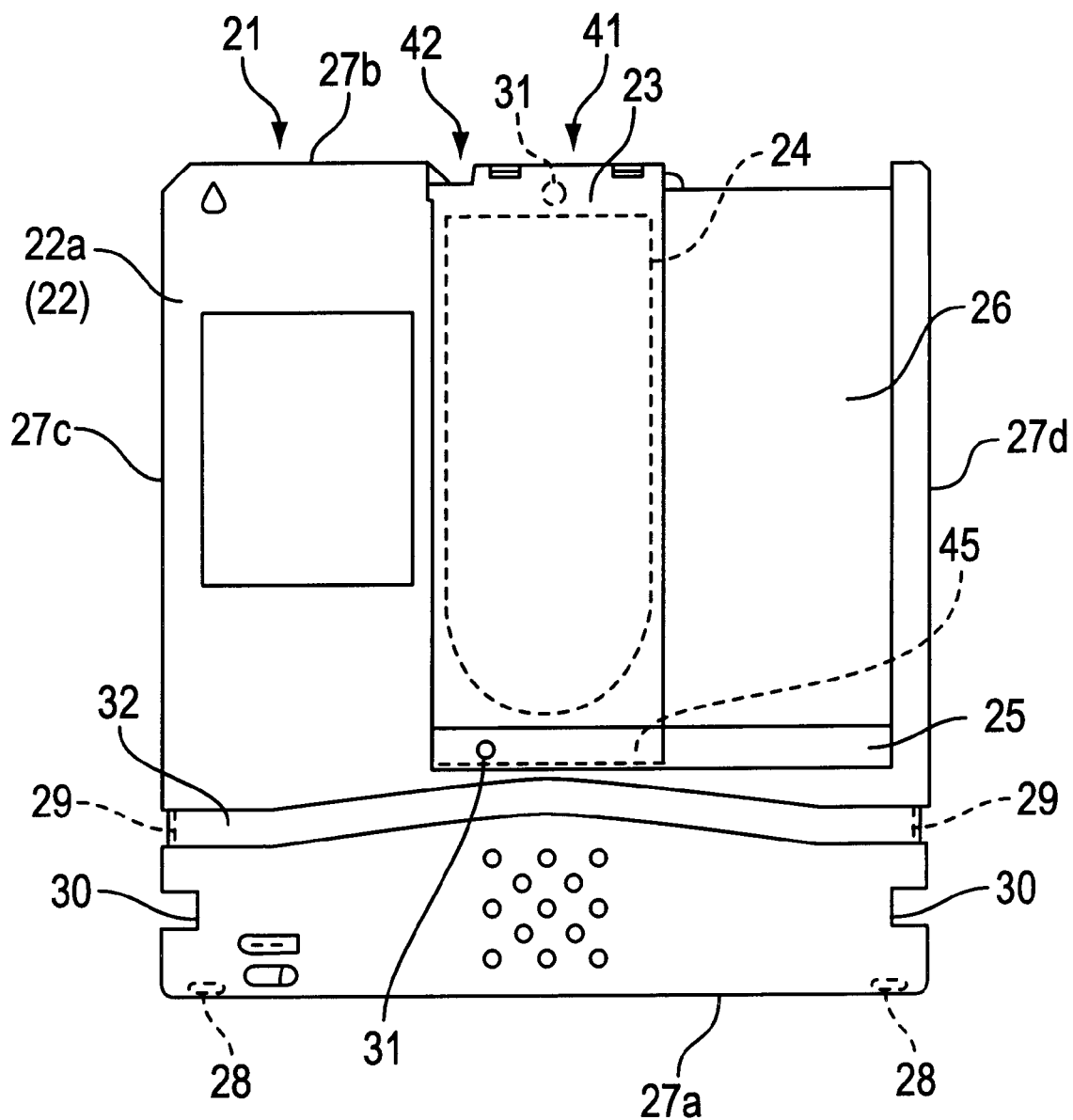
FIG. 2 is a plan view of the disk cartridge seen from the face side.
Figure 3:
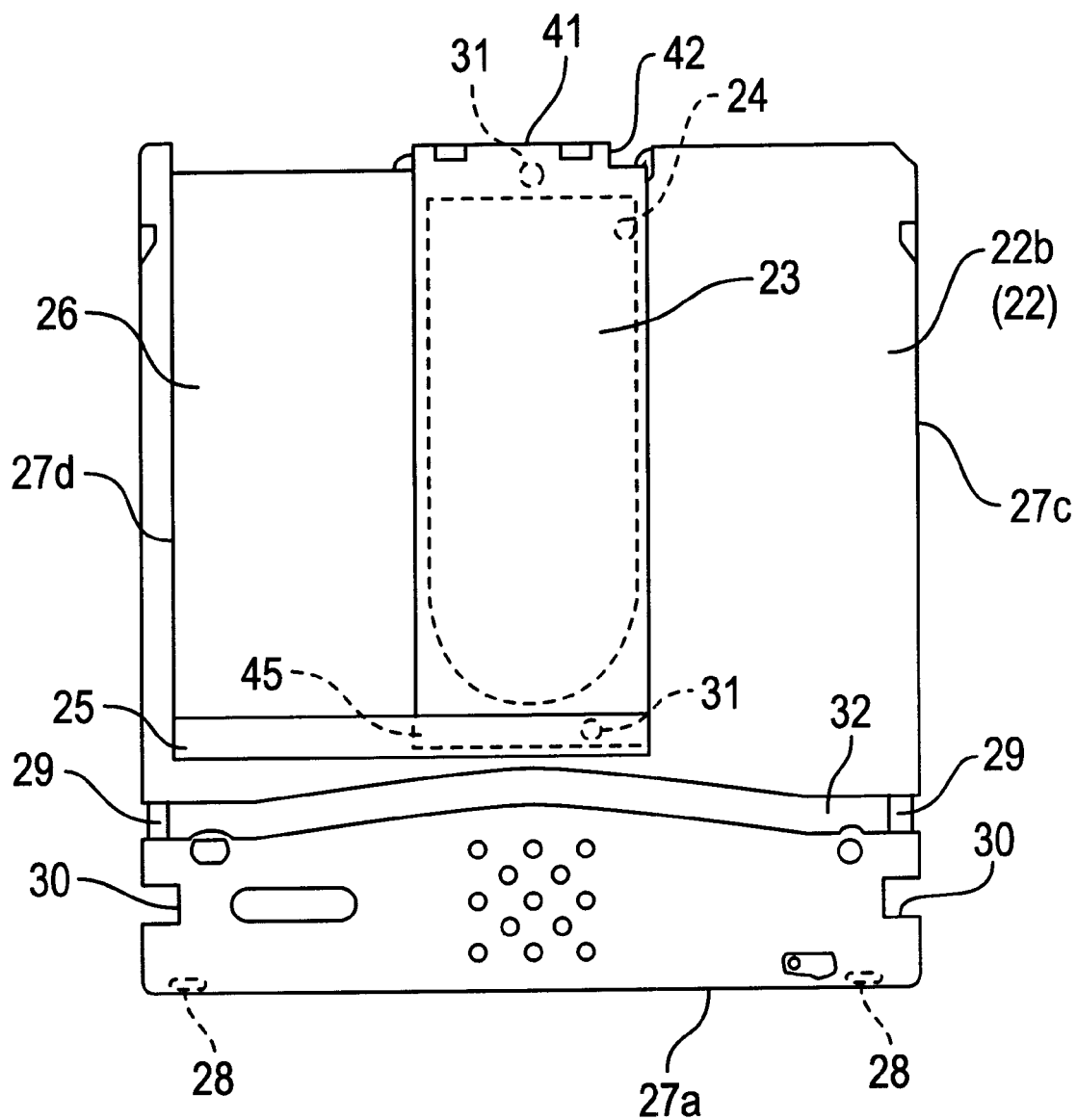
FIG. 3 is a plan view of the disk cartridge seen from the back side.
Figure 4:
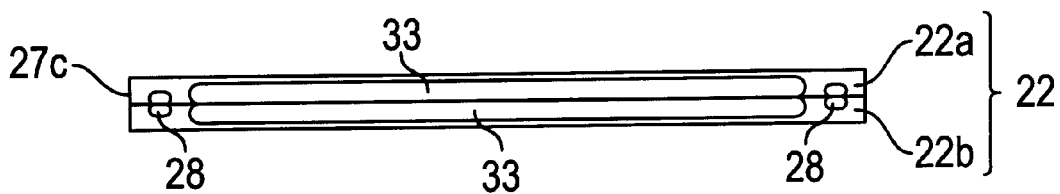
FIG. 4 is a side view of the disk cartridge seen from the rear end side.

In the resin plate molding method of the conventional cartridge, the resin was poured in from the position of a flow inlet 31 shown in FIG. 2 and FIG. 3 in order to improve the moldability in the thin portion where the resin is hard to flow, that is, in the portion 26 corresponding to the moving range of the shutter 23. In this molding method, however, the flow inlet 31 may be left over like a protuberance, or the resin plate may be curved due to molding strain, and hence the smooth movement of the shutter 23 was often impaired.

By contrast, in the disk cartridge 21 of the embodiment, between the portion 26 corresponding to the moving region of the shutter 23 and the rear end side 27a, a groove 32 is formed to extend in the moving direction of the shutter 23, that is, in the lateral direction. In this case, the resin poured in from the injection port of the molding die at a location depicted by the numeral 33 (FIG. 4) corresponding to the rear end side 27a of each rear plate 22a, 22b. The resin flows from the rear end side 27a in a direction toward the front end 27b. When the resin passes from the rear end side 27a in a direction through the protuberance portion of the molding die corresponding to the groove 32, the flowing resin hits against the protuberance portion and is reheated, and the resin temperature rises. As a result, the flowability of the resin is improved, and the thin portion 26 of the moving range is formed uniformly. It is hence free from problems in shutter movement due to residue or curve in the flow inlet portion.

Figure 5:
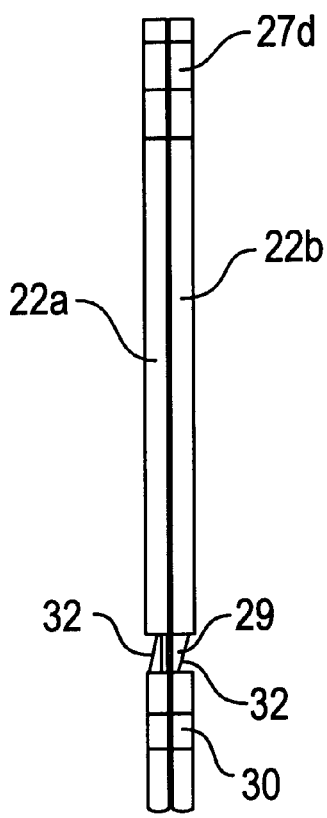
FIG. 5 is a side view of the disk cartridge seen from the right side.
Figure 7:
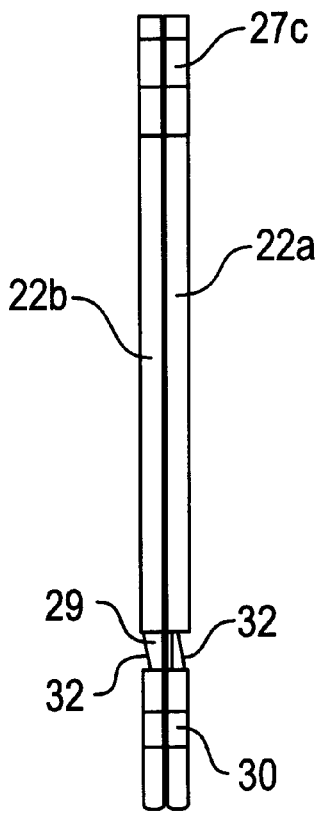
FIG. 7 is a side view of the disk cartridge seen from the left side.
Figure 6:
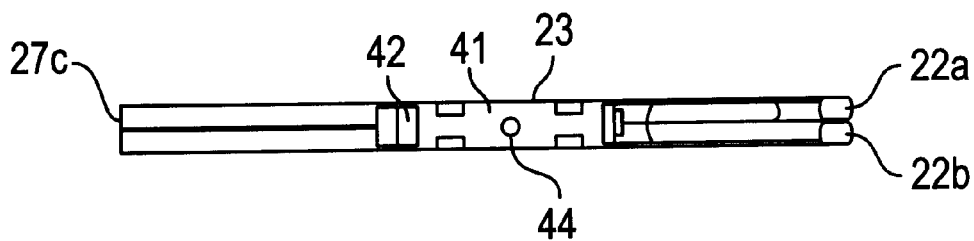
FIG. 6 is a side view of the disk cartridge seen from the front end side.
Figure 8:
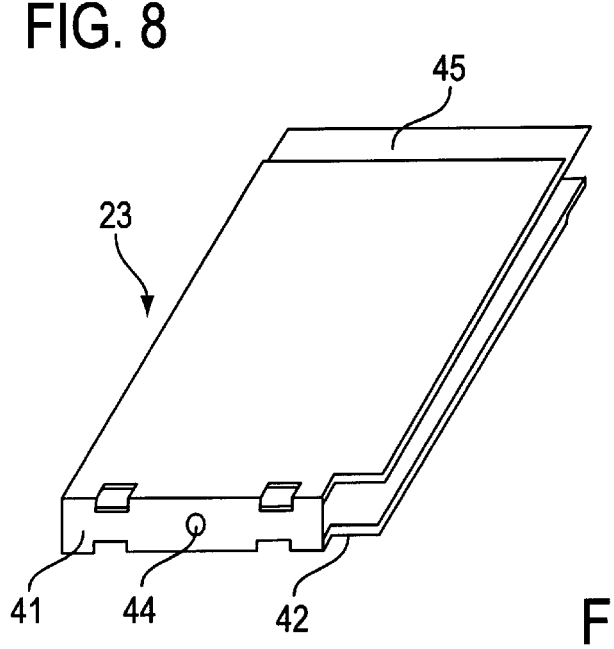
FIG. 8 is a perspective view of a shutter in the disk cartridge.
Figure 9:
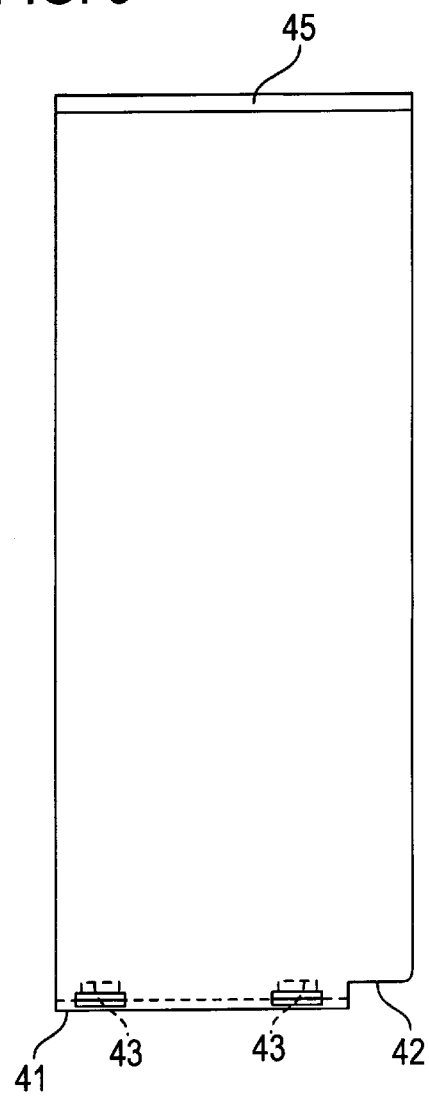
FIG. 9 is a plan view of the shutter seen from the face side.

Incidentally, the groove 32 brings about other effect, too. The bottom of the groove 32 is parallel to each other at the face side and back side as shown in FIG. 5 and FIG. 7, and has an inclination toward the insertion direction of the cartridge 21. In this case, by disposing the light emitter for emitting a light beam toward the bottom of the groove 32 and the photo sensor for receiving the reflected light beam at proper positions on the tray 1, the reflection direction of the reflected light beam differs between when the cartridge 21 is mounted on the face side and when it is mounted on the back side, so that the face and back of the cartridge 21 can be judged from the signal of the photo sensor. Therefore, by forming such groove 32 with an inclined bottom and making use of the signal from the photo sensor, the face and back can be judged, and wrong loading operation can be warned.

The shutter 23 of the disk cartridge 21 is described below while referring to FIG. 8 to FIG. 12.

The shutter 23 is nearly shaped in a U form by folding the resin plate so as to cover the both windows 24 of the case 22 as shown in FIG. 11. This folded portion 41 corresponds to the position of the front end side 27b of the case 22. The thickness of the folded portion 41 is slightly thicker than the thickness of the portion covering the windows 24 for assuring the strength. At one end of the folded portion 41, a notch 42 is formed to be used for opening the shutter 23. To control opening and closing of the shutter 23, a plurality of protrusions 43 are formed near the inside of the folded portion 41, while a hole 44 is provided in the middle of the folded portion 41. On the other hand, at the end portion 45 of the opposite side of the folded portion 41, the thickness is thin so as to be inserted between the support piece 25 and the surface of the moving region portion 26.

The shutter 23 is opened and closed in the process of conveyance of the cartridge 21. That is, when conveyance starts, a shutter drive lever (not shown) installed in the disk loading apparatus is caught in the notch 42 of the shutter 23. Consequently, in cooperation with the move of the tray 1, the lever is actuated to open the shutter 23. When the cartridge 21 reaches the recording and reproducing position, the shutter 23 is opened fully.

When taking out the cartridge 21 from the disk loading apparatus, the lever moves reversely to the case above, and the lever is released from the notch 42 during conveyance. By the function of the spring (not shown) provided between the shutter 23 and case 22, the shutter 23 is closed.

In the conventional cartridge, an arm is provided to extend from one end of the folded portion of the shutter in the moving direction of the shutter, and a dent is formed in the arm to hook the lever. In such conventional cartridge, however, the projecting arm may be caught by other objects in the midst of operation or conveyance, and extra space is needed for storage, and ease of handling was inferior.

By contrast, in the cartridge 21 of the embodiment, the projecting arm is not present, and it is easy to handle. Besides, the shutter material is saved, and there is no interfering arm when assembling the cartridge 21, and hence it is also easy to manufacture.

Other embodiments of the invention are described below.

Figure 16:
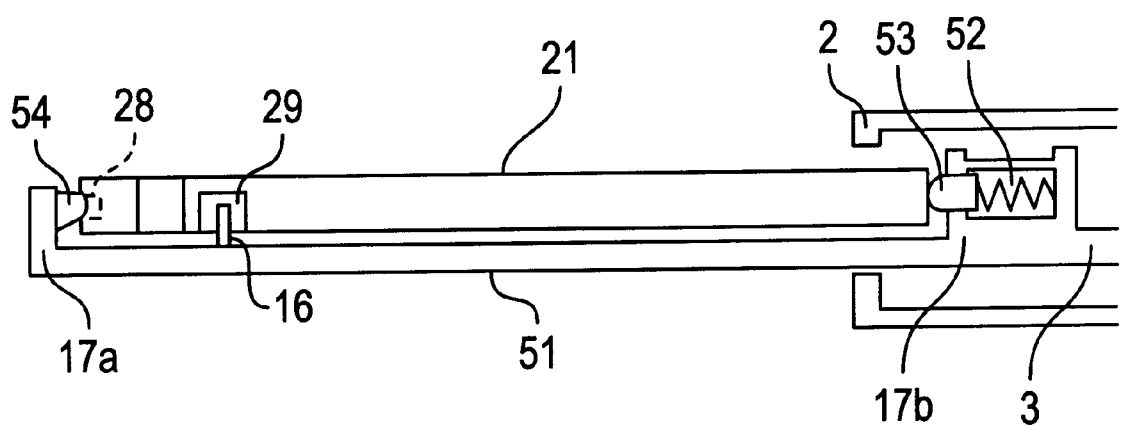
FIG. 16 is a side view of another tray of the invention.

In a tray 51 shown in FIG. 16, a pressure member 53 provided with a spring 52 is disposed on an inner wall 17b, and a protrusion 54 to be engaged with a hole 28 in a cartridge 21 is provided on the inner side of a front wall 17a. This protrusion 54 is formed in one body with the front wall 17a. The other constitution is same as in the tray 1. In this case, too, since the cartridge 21 is supported by the pressing force of the spring 52, the cartridge 21 does not swing or sway during conveyance.

Figure 17:
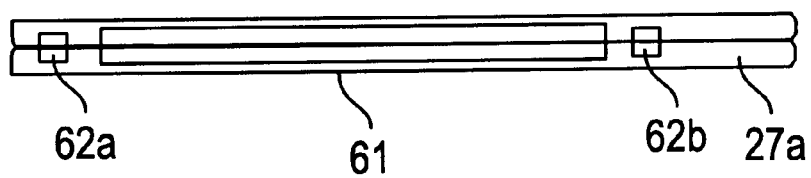
FIG. 17 is a side view of another disk cartridge of the invention seen from the rear end side.

In a cartridge 61 shown in FIG. 17, positioning holes 62a, 62b are formed at asymmetrical positions in the insertion direction in the rear end 27a of the cartridge 61. A tray for loading this cartridge 61 is provided with push springs 18 at positions corresponding to the holes 62a, 62b. In this case, when the cartridge 61 is put on the tray upside down, the holes 62a, 62b and push springs 18 are not fitted, and the rear end side of the cartridge hardly gets into the tray. Therefore, without recesses 29 and projections 16 for judging face and back, wrong loading of cartridge can be detected.

The invention is not limited to the illustrated embodiments alone, but various modifications are possible. For example, in the foregoing embodiments, holes are provided at the rear end side of the cartridge, but they may be provided at either right or left side. Instead of two holes, one or three or more holes may be provided.

It must be therefore understood that all changes and modifications existing within the true spirit and scope of the invention are included in the scope of the claims.

What is claimed is:

1. A tray for loading a flat disk cartridge into a disk loading apparatus, said disk cartridge having a flat case for accommodating a disk, said case including, a face side and a back side, a right side and a left side,
a front end and a rear end on a peripheral side of the case,
a shutter forming part of the front end, and
at least one positioning hole provided on said rear end,
said tray comprising:
a bottom plate;
a wall provided on an outer circumference of said bottom plate, said wall having an inner front side and an inner rear side,
at least one positioning protrusion provided on the inner rear side of said wall;
wherein said at least one positioning protrusion is fitted with a respective one of said at least one positioning hole, and wherein said at least one positioning protrusion is a push spring having a curved portion, said push spring deforming elastically when said disk cartridge is placed on the tray and providing a rigid positioning of said disk cartridge on the tray.

2. The tray of claim 1,
wherein said case further includes, a plurality of recesses on said back side near the rear end, and
wherein said tray further comprises,
projections provided on the bottom plate near the inner rear side of said wall of the tray for respective matching with said recesses of the cartridge when the flat case is loaded properly on the tray.

3. The tray of claim 1,
wherein said at least one positioning protrusion includes a plurality of positioning protrusions at asymmetrical positions from the center of said inner rear side of said wall.

4. The tray of claim 1 further comprising:
a pressure means disposed on the inner front side of said wall of said tray, and
wherein said pressure means deforms elastically when said disk cartridge is placed on the tray to further provide the rigid positioning of the disk cartridge on the tray.

5. A tray for loading a disk cartridge into a disk loading apparatus,
said disk cartridge having a flat case for accommodating a disk,
said case including,
a face side and a back side,
a right side and a left side,
a front end and a rear end,
a shutter forming part of the front end,
a plurality of recesses on said back side near the rear end,
wherein at least one of said recesses is located on said right side and another of said recesses is located on said left side;
said tray comprising:
a bottom plate;
a wall provided on an outer circumference of said bottom plate, said wall having an inner front side and an inner rear side;
projections provided on the bottom plate near the inner rear side of said wall of the tray for respectively matching with the recesses of the cartridge when the flat case is loaded properly on the tray, and
at least one positioning protrusion provided on said wall, said at least one positioning protrusion is a push spring having a curved portion, said push spring deforming elastically when said disk cartridge is placed on the tray and providing a rigid positioning of said disk cartridge on the tray.

6. A tray for loading a disk cartridge into a disk loading apparatus,
said disk cartridge having a flat case for accommodating a disk, said case including,
a face side and a back side,
a right side and a left side,
a front end and a rear end on a peripheral side of the case,
a shutter forming part of the front end, and
a plurality of positioning dents provided on said rear end,
said tray comprising:
a bottom plate;
a wall provided on an outer circumference of said bottom plate, said wall having an inner front side and an inner rear side;
a plurality of positioning protrusions provided on the inner rear side of said wall, each of which is fitted with a respective one of said plurality of positioning dents; and
pressure means provided on the inner front side of said wall, which deforms elastically when said disk cartridge is placed on the tray and provides a rigid positioning of said disk cartridge on the tray together with said plurality of positioning protrusions.

7. The tray of claim 6,
wherein said case further includes a a right side recess and a left side recess in the right side and left side near the back end of the case, respectively,
said wall of the tray includes an inner right side and an inner left side, and
said tray further comprises a right side projection and a left side projection provided on the bottom plate proximate the inner right side and the inner left side of said wall near the inner rear side of said wall for matching with the right side recess and the left side recess of said case, respectively, when said case is loaded properly on the tray.

* * * * *